UNITED STATES PATENT OFFICE 2,128,508

AZO DYESTUFFS

Richard Stusser, Cologne, and Friedrich Muth, Leverkusen, Germany, assignors to General Aniline Works, Inc., New York, N. Y., a corporation of Delaware No Drawing. Application June 21, 1935, Serial No. 27,811. In Germany June 27, 1934

5 Claims. (Cl. 260—152)

The present invention relates to azo dyestuffs forming heavy metal complex compounds; more particularly it relates to dyestuffs which may be represented by the probable general formula:—

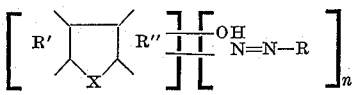

wherein R stands for the radical of a diazo compound, capable of forming heavy metal complex compounds, which may bear an azo group, such as a radical of a diazotized aromatic amine bearing in ortho-position to the diazotized amino group a metal complex forming group, such as the hydroxy group, an alkoxy group and the carboxylic-acid group

and

stand for radicals of the benzene series, wherein OH and N=N.R stand in ortho position to each other attached to one of the benzene radicals R' and R'', $n$ stands for one or two, $x$ stands for S, O, $CH_2$ or $CH=CH$, and wherein the benzene radicals R' and R'' may bear further substituents, such as alkyl, alkoxy, halogen, the sulfonic acid group, the carboxylic acid group, the sulfone amide group and the carboxylic acid amide group, the hydrogen atoms of which may be substituted for example by alkyl or aryl.

Our new dyestuffs are obtainable by diazotizing or tetrazotizing respectively an aromatic amine, capable of forming heavy metal complex compounds and coupling with one or two equimolecular proportions respectively of a coupling component of the general formula:—

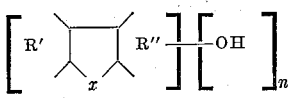

wherein $x$ and $n$ mean the same as stated above.

The dyestuffs thus obtained can be transformed in substance or on the fiber into their heavy metal complex compounds by treating with suitable metals or metal compounds, such as copper, copper hydroxide, copper salts, chromium hydroxide, chromium salts and the like. Those of our dyestuffs having water-solubilizing groups are suitable for dyeing the fiber, yielding generally brown to violetish-brown to blackish-brown shades, which when transformed into their heavy metal complex compounds are distinguished by good fastness to fulling, carbonization and light. Those of our dyestuffs which are insoluble in water dissolve in organic solvents, such as pyridine and can be used for shading lacquers.

The invention is illustrated by the following examples, without, however, being limited thereto:—

Example 1

One molecular proportion of 6-nitro-2-aminophenol-4-sulfonic acid is diazotized and coupled in aqueous caustic alkaline solution in the presence of sodium carbonate with one molecular proportion of 3-hydroxy-diphenylene sulfide in the cold and in the presence of pyridine. After several hours the coupling mixture is acidified, some common salt is added, and the dyestuff separated is filtered and dried. It is obtained in the form of a dark powder, soluble in aqueous sodium carbonate solution, dyeing wool from an acid bath; it corresponds in its free state to the following formula:—

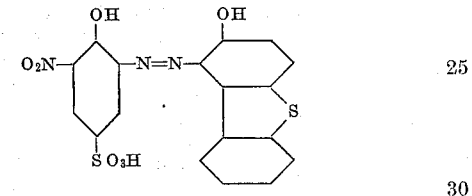

By after-treating the dyeings with bichromate there are obtained corinth shades fast to fulling, carbonization and light.

Example 2

One molecular proportion of diazotized 5-sulfo-2-aminobenzoic acid is coupled with one molecular proportion of 3-hydroxy-diphenylene oxide in an alkaline medium. When the coupling is complete, the dyestuff is salted out with common salt, filtered and dried. It is obtained in the form of a dark powder, soluble in water and dyeing wool from an acid bath reddish-brown shades; it corresponds in its free state to the following formula:—

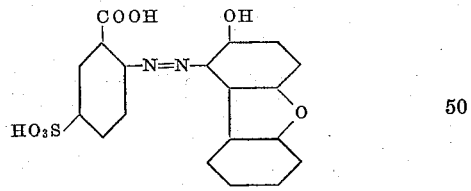

By after-chroming there is obtained an olive brown fast to fulling, carbonization and light.

By substituting the 5-sulfo-2-aminobenzoic acid by one molecular proportion of 1-amino-2-hydroxy - 6 - nitronaphthalene - 4 - sulfonic acid there is obtained a dyestuff dyeing wool when after-chromed blackish-brown shades of good fastness properties.

*Example 3*

One molecular proportion of diazotized 4-nitro-2-aminophenol-6-sulfonic acid is coupled in an alkaline medium with one molecular proportion of the 3-hydroxy-diphenylene oxide 2-carboxylic acid. The dyestuff having in its free state the following formula:—

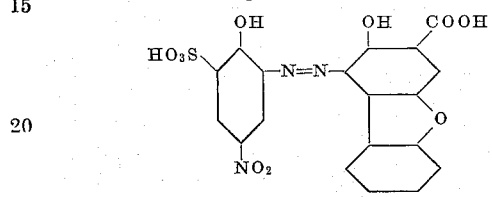

dyes wool when after-chromed reddish-brown shades.

In an analogous manner diazotized 1-amino-4-nitrobenzene 6-carboxylic acid yields when coupled with 3-hydroxy-diphenylene oxide monosulfonic acid (obtained by monosulfonating 3-hydroxy-diphenylene oxide; probably the 2-sulfonic acid) a dyestuff dyeing wool yellowish brown shades, which on after-chroming are turned to dark brown.

*Example 4*

One molecular proportion of tetrazotized 4,4'-diaminodiphenyl-3,3'-dicarboxylic acid is coupled in a bicarbonate alkaline medium containing a small quantity of pyridine with one molecular proportion of 3-hydroxy-diphenylene oxide and after this in a soda alkaline medium with one molecular proportion of 1(4'-sulfophenyl)3-methyl-5-pyrazolone. The dyestuff corresponding in its free state to the following formula:—

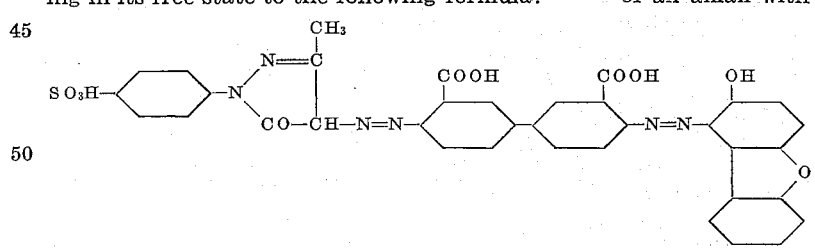

dyes cotton brown shades which when after-treated with a copper compound are turned to yellowish brown of good fastness to washing and light.

*Example 5*

One molecular proportion of diazotized 6-nitro-2-aminophenol-4-sulfonic acid is coupled in a soda alkaline medium containing pyridine with one molecular proportion of 6-bromo-3-hydroxy-diphenylene oxide. The dyestuff corresponding in its free state to the following formula:—

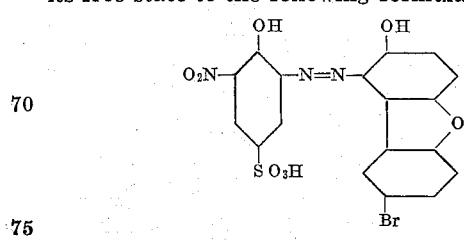

dyes wool when after-chromed negro-brown shades of good fastness properties.

*Example 6*

20 grams of the dyestuff described in the first paragraph of Example 2 are refluxed for 10 hours in 300 ccs. of water with 6 grams of a chromium chloride solution containing 270 grams of $Cr_2O_3$ per litre. The complex chromium compound formed is filtered and dried. It is a dark powder soluble in water, dyeing wool from an acid bath olive brown shades of good fastness to fulling, carbonization and light.

*Example 7*

One molecular proportion of 6-nitro-2-aminophenol-4-sulfonic acid is diazotized in the usual manner and coupled in an alkaline medium with one molecular proportion of 3-hydroxyphenanthrene. When the coupling is complete the reaction mass is acidified with acetic acid and the dyestuff separated is filtered and dried. It is obtained in the form of a dark powder, dyeing wool from an acid bath; on after-chroming the dyeing there is obtained a grey or in the case of dark shades a black of good fastness to fulling, carbonization and light.

The dyestuff corresponds in its free state to the following formula:—

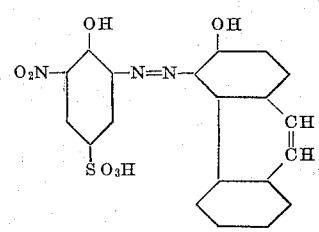

*Example 8*

One molecular proportion of 6-nitro-2-aminophenol-4-sulfonic acid is diazotized in the usual manner and coupled in pyridine in the presence of an alkali with one molecular proportion of 2-hydroxy fluorene. After stirring for some hours the coupling mixture is rendered acid to Congo red, some common salt is added and the dyestuff separated is filtered. After re-dissolving and drying, the dyestuff having in its free state the following formula:—

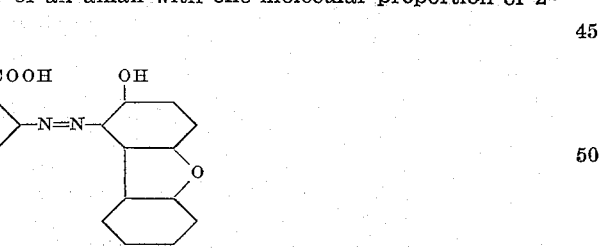

is obtained in form of a dark powder, dyeing wool reddish-brown shades, which on after-chroming are turned to olive-brown of good fastness to fulling, carbonizing and light.

*Example 9*

Two molecular proportions of diazotized 4-nitro-2-aminophenol-6-sulfonic acid are coupled in a caustic alkaline medium containing pyridine with one molecular proportion of 3,6-dihydroxy-diphenylene oxide. The dyestuff having in its free state the following formula:—

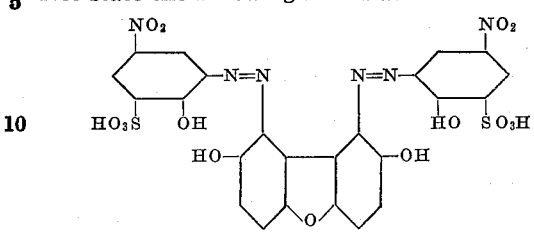

dyes wool when after-chromed blackish-brown shades.

*Example 10*

One molecular proportion of diazotized 4-nitro-2-aminophenol-6-sulfonic acid is coupled in an alkaline medium with one molecular proportion of the 3-hydroxy-diphenylene oxide. The dyestuff having in its free state the following formula:—

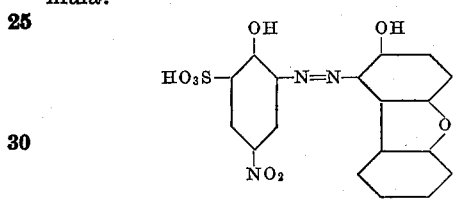

dyes wool from an acid bath brown shades which by after-chroming are turned to blackish brown of good fastness to fulling, carbonization and light.

We claim:

1. Water-soluble azo dyestuffs forming heavy metal complex compounds of the general formula:

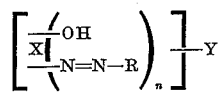

wherein X stands for the radical of a diphenylene oxide compound, R stands for the radical of a diazo compound, capable of forming heavy metal complex compounds, OH and N=N—R stand in ortho position to each other, $n$ stands for one of the numbers one and two and Y stands for a water-solubilizing group selected from the class consisting of the sulfonic acid and the carboxylic acid groups, yielding generally brown to violetish-brown to blackish-brown shades, which when transformed into their heavy metal complex compounds are distinguished by good fastness to fulling, carbonization and light.

2. Water-soluble azo dyestuffs forming heavy metal complex compounds of the general formula:

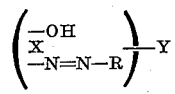

wherein X stands for the radical of a diphenylene oxide compound, R stands for the radical of a diazo compound, capable of forming heavy metal complex compounds, OH and N=N—R stand in ortho position to each other and Y stands for a water-solubilizing group selected from the class consisting of the sulfonic acid and the carboxylic acid groups yielding generally brown to violetish-brown to blackish-brown shades, which, when transformed into their heavy metal complex compounds, are distinguished by good fastness to fulling, carbonization and light.

3. The water-soluble azo dyestuff having in its free state the following formula:

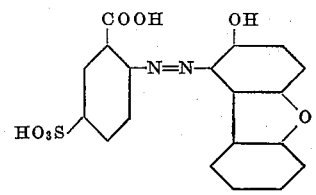

dyeing wool from an acid bath reddish-brown shades, which by after-chroming are turned to olive brown fast to fulling carbonization and light.

4. The water-soluble azo dyestuff having in its free state the following formula:

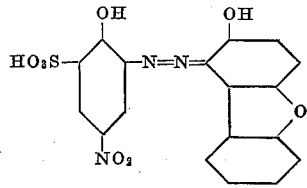

dyeing wool from an acid bath reddish-brown shades, which by after-chroming are turned to blackish brown fast to fulling carbonization and light.

5. The water soluble azo dyestuff having in its free state the following formula:

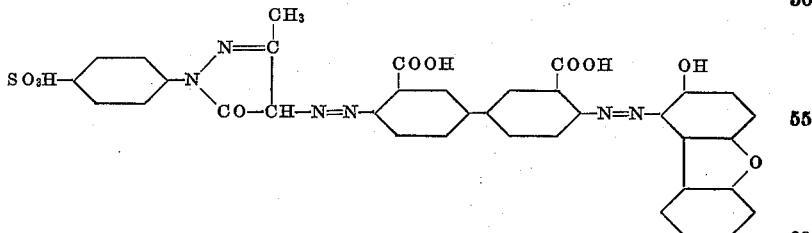

dyeing cotton brown shades which by after-treatment with a compound yielding copper are turned to yellowish brown shades of good fastness to light and washing.

RICHARD STUSSER.
FRIEDRICH MUTH.